REMOTE SYNC HOLD CIRCUIT

Filed April 29, 1953 2 Sheets-Sheet 1

INVENTOR
IRVING A. KRAUSE
BY Percy P. Lantzy
ATTORNEY

REMOTE SYNC HOLD CIRCUIT

Filed April 29, 1953 2 Sheets-Sheet 2

INVENTOR
IRVING A. KRAUSE
BY Percy P. Lantzy
ATTORNEY

United States Patent Office 2,720,555
Patented Oct. 11, 1955

2,720,555

REMOTE SYNC HOLD CIRCUIT

Irving A. Krause, Nutley, N. J., assignor to International Telephone and Telegraph Corporation, a corporation of Maryland Application April 29, 1953, Serial No. 351,925
18 Claims. (Cl. 178—69.5)

Figure 1:
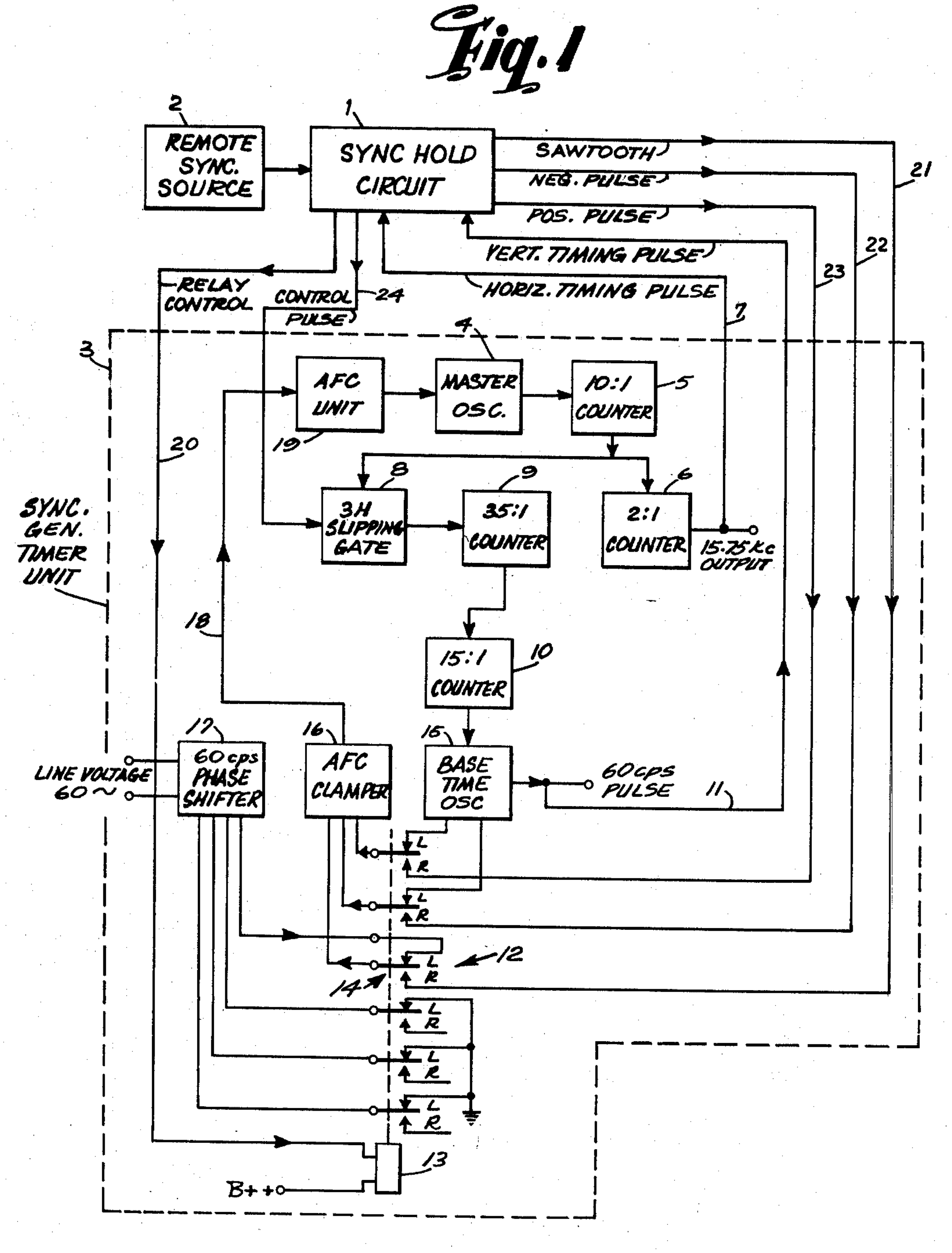

This invention relates to technical facilities of television studio programing and more particularly to means for synchronizing the local synchronizing generator to the sync signal of a composite television signal of a remote source.

Incorporated within the television studio to meet programing requirements are available various special effects, such as montage, superposition, lap, fad, and wipe dissolve, which in many instances are effective only as long as all programing material is obtained within the studio referenced to the same synchronizing generator. The application of these special technical facilities to program material originating at a remote point is ineffective unless the local synchronizing generator is synchronized in both frequency and phase, with the mixed sync of the remote composite signal. It has been recognized, heretofore, that the addition of an appropriate locking circuit will perform this synchronizing function thereby enabling the application of special effects and other facilities to a remotely generated composite video signal.

Sync lock or hold circuits in the past have employed rather complex arrangements of automatic frequency control and subtraction circuitry to establish the desired frequency and phase unison between the local sync generator output and the sync signals of a remote composite video signal. Furthermore, it has been discovered that the rapidity of achieving the desired locking of the local sync generator to a remote sync signal plays a rather important part in the efficient operation of a home receiver. Where the locking action is substantially instantaneous in the sync lock circuit of the prior art, a receiver will tend to exhibit a "rolling" display as the lock-in of the generator is accomplished at the transmitter.

Therefore, it is an object of this invention to provide a relatively simple means to lock a local synchronizing generator in both the phase and frequency to the sync signal of a remote signal source.

Another object of this invention is to provide a remote sync hold circuit to lock a local synchronizing generator to the phase and frequency of a remote sync signal wherein the reaction time thereof is of sufficient length to eliminate the possibility of a receiver exhibiting a "rolling" display when the referencing of the outputs of the local sync generator timer is shifted from the local sync reference signal to a remote sync signal.

A feature of this invention is the provision of a circuit combination to cooperate with the local sync generator timer of a local synchronizing generator to lock the output therefrom in both phase and frequency to the sync signal of a remote signal source wherein said circuit combination includes a comparison means to produce a correction output when the repetition rate of the remote horizontal sync pulses and the locally generated horizontal timing pulses exhibit a frequency difference for control of the frequency output of the master oscillator of the local sync generator timer and a control means activated by the non-coincidence of the remote equalizer pulses and the locally generated vertical timing pulses to produce a control pulse having a predetermined width for phase correction of the vertical timing pulse output of the local sync generator timer.

Another feature of this invention is the provision of a control means rendered operable upon the non-coincidence of the remote equalizer pulses and the locally generated vertical timing pulse for production of a control pulse of predetermined width which is coupled to the local timing pulse producing device for a suspension of the counting operation thereof for a period of time equivalent to the width of said control pulse during each scanning field until phase unison is established between the sync signals of a local sync generator and a remote sync source.

Further features of this invention include a switching means activated by the control means of the sync hold circuit to switch the local sync generator timer from synchronization with the normal local locking reference to synchronization with respect to the signal of a remote sync source upon receipt of a signal from said sync source; and a noise protection circuit associated with the output circuit of a non-coincident gating device included in the control means to present substantially a short circuit to noise pulses which if allowed to pass would cause the sync hold circuit to slip and recycle thereby destroying the effectiveness of the desired locking of the local synchronizing generator to the remote video signal.

Figure 2:
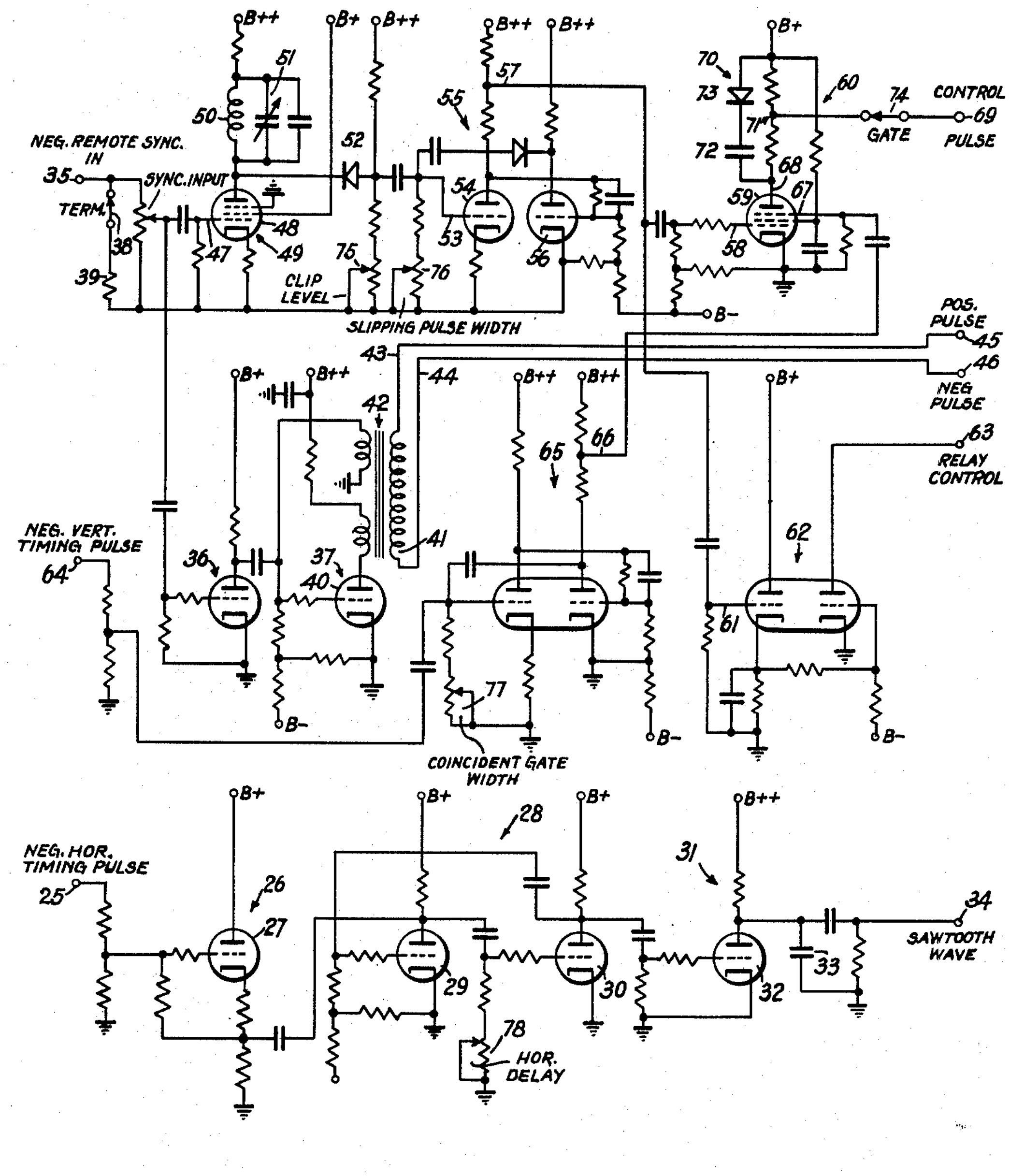

The above-mentioned and other features and objects of this invention will become more apparent by reference to the following description taken in conjunction with the accompanying drawings, in which:

Fig. 1 illustrates in block form the cooperation of the sync hold circuit with given portions of the local sync generator timer unit following the principles of this invention; and Fig. 2 is a schematic diagram of the sync hold circuit of Fig. 1.

Referring to Fig. 1, sync hold circuit 1 of this invention is shown to be associated with a remote sync signal source 2, said sync signal being derived from any composite video signal generated from a point remotely located from the studio equipment, such as a network signal or a signal emanating from a mobile field station. Remote sync source 2 is arranged to present negative sync signals having a vertical blanking interval each scanning field containing horizontal sync pulses, vertical sync pulses, and equalizer pulses to sync hold circuit 1 for action thereupon in cooperation with certain signals of local sync generator timer unit 3 to develop certain outputs for application to timer unit 3 in a manner whereby the local synchronizing generator output is caused to be synchronized to the remote sync signal.

The timer unit 3 is shown to essentially comprise a master oscillator 4 to establish a desired frequency output, say 315 kc., which is counted down ten times by counter 5. This resultant frequency signal, 31.5 kc., is applied to counter 6 for reduction thereof by a factor of two, or to 15.75 kc., to constitute the horizontal timing pulses or trigger pulses for the local sync generator which is, in my circuit arrangement fed back to sync hold circuit 1 by conductor or lead 7 for cooperation in assuring that the master oscillator 4 frequency is locked to the repetition rate of remote horizontal sync pulses. The output of counter 5 is also coupled to slipping gate 8 which remains in a conducting state as long as the sync generator timer 3 is synchronized with respect to the appropriate reference signal, either the line voltage signal or remote sync signal. The frequency signal applied to gate 8 is coupled therethrough to counter 9 and hence to counter 10 to derive the desired vertical timing pulses repetitious at a 60 cycle per second rate or employment in the local sync generator and for coupling via conductor or lead 11 to sync hold circuit 1 to cooperate in the production of a control pulse which operates on gate 8 to correct the phasing of the vertical timing pulse with respect to the remote sync signal.

Sync timer unit 3 further includes a switching means 12 including a relay coil 13 and contacts 14 illustrated to be in the unenergized or "lock to line" (L) position which allows the sync generator timer 3 to be locked in phase and frequency to the normal 60 cycle line voltage when synchronizing a locally generated picture signal. When means 12 is in this position, the output signal of base time oscillator 15, synchronous with the repetition rate of the vertical timing pulse, is coupled through switching means 12 to an automatic frequency control clamper 16. The line frequency signal is likewise coupled through switching means 12 to clamper 16 from phase shifter 17 resulting in a voltage signal representative of the phase difference existing between the line voltage signal and the output of oscillator 15 for conduction along path 18 to automatic frequency control 19 which provides an output signal to achieve a synchronized frequency output from master oscillator 4.

When it is desired to lock timer 3 to a remote signal sync, hold circuit 1 under the influence of negative sync from source 2, will produce a relay control pulse for conduction along conductor 20 to energize coil 13 which activates contacts 14 to move into the "lock to remote" (R) position. When switching means 12 is energized the outputs from time base oscillator 15 and phase shifter 17 are automatically removed from the input to clamper 16 and certain predetermined outputs from sync hold circuit 1 take their place to cooperate in providing the desired locking of master oscillator 4 to the repetition rate of the horizontal sync pulses of sync source 2.

It is the purpose of sync hold circuit 1 to lock a local television synchronizing generator in both phase and frequency to a remote sync signal. This circuit provides a gradual lock-in action by virtue of the gating circuitry employed therein so that a receiving device functioning under the influence of sync pulses derived from the sync generator will not "roll" as the lock-in of the generator proceeds. The master oscillator 4 is locked to the remote horizontal sync pulses through cooperation of the horizontal timing pulses traveling on conductor 7 and the remote horizontal sync pulses. The horizontal timing pulses cooperate to produce a sawtooth wave for conduction along conductor 21 and the remote horizontal sync pulses cooperate to produce pulses having both negative and positive polarity for conduction along conductors 22 and 23 which are applied through switching means 12 to the clamper 16 and hence to AFC unit 19 for comparison of the repetition rates thereof. If an error is detected a controlling signal is produced to adjust the frequency output of master oscillator 4 so that the timing pulse outputs of timer 3 will be in proper phase relationship with the synchronizing pulses of the remote sync signal.

If the vertical interval as established by timer 3 is incorrectly phased with respect to the vertical interval of the signal from source 2, sync hold circuit 1 will recognize this fact from the non-coincidence of a pulse having a given width as derived from the equalizer pulses of the signal of source 2 and a second pulse having substantially the same given width derived from the vertical timing pulse conducted along conductor 11. This non-coincidence of given width pulses will provide a gate or control pulse for conduction along lead 24 which will activate slipping gate 8 in a manner to provide a slippage in the counting operation of counter 9 three lines for each scanning field until the vertical timing pulse is within three lines of phase synchronization with the vertical blanking interval of the signal of source 2. When this phasing is within three lines, counter 9 is then slipped one, two or three lines, depending upon the requirement, so that on the subsequent scanning field all the timing pulses of timer 3 will be in unison with the sync signal of source 2.

Fig. 2 illustrates with greater particularity the circuit arrangement of sync hold circuit 1, the description of which in conjunction with Fig. 1 will more clearly define the functioning thereof and the cooperation existing between circuit 1, source 2 and predetermined portions of the local timer unit 3 necessary to achieve the desired synchronization of the local synchronizing generator with respect to the sync signals of source 2.

To achieve the frequency locking of master oscillator 4 to the remote sync source 2, it is necessary to employ a comparison means as hereinabove outlined. The horizontal timing pulse derived from oscillator 4 by counter 6 is coupled along conductor 7 to terminal 25 having a negative polarity. From terminal 25 this timing pulse is coupled to cathode follower 26 including electron discharge device 27 employed primarily to match the impedance of conductor 7, say a coaxial lead, to multivibrator 28. Multivibrator 28 includes electron discharge devices 29 and 30 incorporating therewith appropriate circuitry for production of a narrow pulse of positive polarity repetitious at a rate of the horizontal timing pulse. This narrow pulse is fed to sawtooth generator 31 including electron discharge device 32 which in cooperation with condenser 33 will produce a sawtooth wave signal synchronized with respect to the timing pulse output of counter 6. This sawtooth signal is then applied to terminal 34 for conduction along lead 21 through energized switching means 12 to AFC clamper 16.

Simultaneously negative remote sync signals from source 2 are fed to terminal 35 for coupling to both the control means and a portion of the comparison means including an amplifier 36 and blocking oscillator 37. Terminal 35 is provided with a switch 38 and a resistor 39 wherein resistor 39 has a value substantially equal to 75 ohms which in some instances is employed for termination of the coaxial lines used to couple between remote sync source 2 and terminal 35. The remote sync signal is applied to the grid of electron discharge device 40 of blocking oscillator 37 to cause a triggering thereof for the generation of pulses of both positive and negative polarity synchronous with the repetition rate of the horizontal sync pulses of source 2. The positive and negative pulse outputs from the secondary 41 of the blocking oscillator transformer 42 are coupled along leads 43 and 44, respectively, to terminals 45 and 46 for conduction along leads 23 and 22 through energized switching means 12 to the AFC clamper 16.

The operation of clamper 16 is such that the amplitudes of the sawtooth wave coupled along conductor 21 and both the positive and negative pulse outputs coupled along conductors 23 and 22, respectively, are restored or referenced to a particular D. C. voltage level and the resultant output therefrom is conducted to automatic frequency control unit 19 along lead 18. Unit 19 is responsive to the referenced amplitude of the signals derived from the horizontal triggering pulse and the remote horizontal sync signal in a manner whereby a difference of repetition rates existing therebetween will be recognized and a correcting voltage will be applied to oscillator 4 to synchronize the output therefrom with respect to the horizontal sync signal of source 2. When such a synchronization is established by the functioning of the comparison means the repetition rate of the timing pulse outputs of timer 3 will be frequency locked to the sync signals of source 2.

Now that the repetition rates of timing pulses of timer 3 are in step with the sync signals of source 2, it is necessary to establish phase unison therebetween. This is accomplished by the operation of the control means of circuit 1 whereby the vertical timing pulse output of counter 10 is appropriately phased with respect to the vertical blanking interval of source 2 such that the vertical blanking interval of the local synchronizing generator will be in phase synchronism therewith. This is accomplished by the application of negative sync pulses from source 2 to the grid 47 of electron discharge device 48 of pulse width discriminator 49. Width discriminator 49 is tuned by means of inductance 50 and variable capacitor 51 for maximum response to the equalizer pulses of the negative sync signal. The output of discriminator 49 is applied to crystal 52 which functions as a series diode clipper and will allow the passage of only the greater amplitude equalizer pulses. From crystal 52 the equalizer pulses are fed to control grid 53 of electron discharge device 54 of multivibrator 55. Multivibrator 55 including electron discharge device 56, electron discharge device 54 and known circuit components associated therewith is adjusted to produce a positive pulse at 57 having a width equivalent to the time necessary for achieving three horizontal scanning lines. Multivibrator 55 is triggered or fired by the first equalizer pulse occurring in each field and having a recovery time substantially equal to $\frac{1}{60}$ of a second so that it will not be triggered again on latter equalizer pulses of the same field, but is ready to be triggered by the first equalizer pulse of the subsequent field. The pulse at 57 is fed to control grid 58 of electron discharge device 59 included in non-coincident gate 60 and is also coupled to the control grid 61 of relay detector 62.

Relay detector 62 functions under the influence of remote sync signal to produce a current at terminal 63 for conduction along lead 20 to relay coil 13 causing switching means 12 to be energized such that contacts 14 are moved to complete the circuit between leads 21, 22 and 23 with AFC clamper 16 and further to relocate the ground point on the filter sections of the output filter of clamper 16 to alter the amount of capacitance included in this filter arrangement. When switching means 12 is energized by energy flowing from terminal 63, the sync generator timer 3 is removed from "lock to line" which is the normal reference point for my sync generator timer and is moved to "lock to remote" which enables timer 3 to be synchronized efficiently and automatically with the sync pulses of a remote video signal.

The vertical timing pulse output of counter 10 coupled along lead 11 is applied to terminal 64 for application to multivibrator 65 which is predeterminedly adjusted to produce a negative pulse output slightly wider than the time necessary to achieve three horizontal scanning lines and is applied from point 66 to the suppressor grid 67 of non-coincident gate device 60.

Gate device 60, as a consequence, has on its control grid a positive pulse three horizontal lines wide as derived from the remote signal of source 2 and on its suppressor grid 67 a negative pulse slightly wider than three horizontal lines wide derived from the local timing source. The anode 68 will contain a negative pulse thereon if the two signals at their respective grids are not coiincident. If the pulses are coincident no pulse will be present at anode 68.

When the two pulses present on the control grid 58 and suppressor grid 67 of gate device 60 are non-coincident by three horizontal lines or more, the negative output pulse at anode 68 will be three horizontal lines wide. If these pulses are within two horizontal lines of synchronization, the negative output pulse will have a width of two horizontal lines and an error of coincidence between these two pulses of one horizontal line will produce an output pulse at anode 68 one horizontal line in width. The ouput pulse at anode 68, having a width dependent upon the amount of non-coincidence between the two pulses applied to gate 60 as outlined above, is passed to timer 3 from terminal 69 and along lead 24 to cause slipping gate 8 to be non-conductive for a period of time equivalent to the width of the control pulse. This non-conduction of gate 8 causes the output of counter 9 to slip one, two or three horizontal lines. When the vertical timing pulses of timer 3 are in phase with the remote signal the slipping action will cease and the timing pulse outputs of timer 3, or the vertical blanking interval as produced by my sync generator, will be in phase synchronism with the sync signals, or vertical blanking interval, of source 2.

The anode circuit of gate device 60 is provided with a noise protection circuit 70 bridged across the anode load 71 including capacitor 72 and crystal 73. This noise protection network 70 presents a short circuit to random pulses, as produced by noise, and only permits a pulse occurring at a rate of 60 P. P. S. or greater to get through. Without this noise protection circuit a noise pulse would cause a false control pulse which would cause a recycling of counter 9 which obviously is undesirable. Further, there is provided in the output circuit of gate 60 a switch 74 which under certain conditions of large continuous noise pulses, which my noise protection circuit cannot completely short out, may be opened to eliminate false controlling of slipping gate 8 with the lock of the local sync generator to the remote signal being carried forward by means of the comparator means and the circuitry of unit 3. While the operation of my sync hold circuit is not as effective when switch 74 is opened, it is believed advisable to provide such a switch where large continuous noise pulses may be present rather than having the vertical timing pulse producing circuit recycle continuously under the influence of such noise.

The clipping operation of crystal 52 is provided with a clipping level control as indicated by control 75. There is further provided in grid 53 of multivibrator 55 a slipping pulse width control 76 which enables a readjustment of the width of the output therefrom, preferably to a width of three horizontal lines, and multivibrator 65 is provided with a control 77 which enables the readjustment of the width of its output, preferably to a width of slightly more than three horizontal lines, as the electron discharge devices and associate circuit components age. Multivibrator 28 in the phase comparing means is provided with a delay control 78 which controls the timing of the pulse output therefrom which enables the timing of the sawtooth wave present at terminal 34 to be varied to meet changing conditions of the circuitry as they develop.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a television system having a remote sync signal source with a vertical blanking interval including equalizer and horizontal pulses and a local sync generator timer including a master oscillator and means associated therewith for producing under control of said master oscillator vertical and horizontal timing pulses; a sync hold circuit comprising control means responsive to the equalizer pulses of said source and the vertical timing pulses of said timer for production of a control pulse, means to apply said control pulse to the timing pulse producing means to alter the vertical timing pulse output for phase coincidence with the vertical blanking interval of said source and comparison means responsive to the horizontal pulses of said source and the horizontal timing pulses of said timer for comparison thereof to produce a correction output, means to apply said correction output to said master oscillator to control the frequency thereof whereby the frequency output of said master oscillator is locked to the repetition rate of the horizontal pulses of said source.

2. In a television system according to claim 1, wherein the timing pulse outputs of said timer are normally synchronized with reference to a given frequency and said timer further includes a switching means associated with said control means and said comparison means to switch said timer from synchronization with said given frequency to synchronization with respect to the signal of said source when said control means is activated by the signal of said source.

3. In a television system according to claim 1, wherein said control means includes a pulse width discriminator coupled to said source, a first multivibrator activated by the output of said discriminator, a second multivibrator activated by said vertical timing pulse, and a non-coincident gating device to produce said control pulse upon non-coincidence of the respective outputs of said first and second multivibrators.

4. In a television system according to claim 3, wherein said pulse width discriminator is responsive to pass only the equalizer pulses of each scanning field of said source, said first multivibrator being activated by the first pulse of each series of equalizer pulses conducted through said discriminator to produce an output pulse having a given width, and said second multivibrator being characterized to produce an output pulse having substantially the same given width as the output pulse of said first multivibrator.

5. In a television system according to claim 4, wherein said pulse width discriminator includes means for tuning it for maximum response to negative polarity equalizer pulses, said first multivibrator being operable to produce a positive polarity pulse having a width equivalent to three horizontal lines, and said second multivibrator being responsive to negative polarity vertical timing pulses to produce a negative polarity pulse having a width substantially equivalent to three horizontal lines.

6. In a television system according to claim 3, wherein said non-coincident gating device is characterized to produce a control pulse, the width of said control pulse being determined at least in part upon the phase difference existing between the respective outputs of said first and second multivibrators.

7. In a television system according to claim 6, wherein said timing pulse producing means includes a slipping gate device responsive to said control pulse to cause a phase slippage of the vertical timing pulse output for each scanning field until phase coincidence is established between the vertical blanking interval of said source and the timing outputs of said timer.

8. In a television system according to claim 6, wherein said non-coincident gating device is further characterized to produce a control pulse of negative polarity having a width no greater than three horizontal lines when the respective outputs of said first and second multivibrator are non coincident by more than three horizontal lines with a diminishing width thereof directly proportional to the amount of non-coincidence between said respective outputs when within three horizontal lines of coincidence.

9. In a television system according to claim 8, wherein said non-coincident gating device includes an electron discharge device having an anode, a cathode, a control grid, a screen grid and a suppressor grid rendered conductive by the non-coincidence of said respective outputs, the output of said first multivibrator being coupled to said control grid and the output of said second multivibrator being coupled to said suppressor grid, and an output circuit coupled to said anode for the removal of said control pulse therefrom.

10. In a television system according to claim 9, further including a series network of a capacitor and a unidirectional device shunted across said output circuit to protect the production of said control pulse from the influence of a random signal.

11. In a television system according to claim 1, wherein said comparison means includes a blocking oscillator coupled to said source, a sawtooth wave producing means activated by the horizontal timing pulses of said timer, and frequency control means associated with the outputs of said blocking oscillator and said sawtooth wave producing means for production of said correction output.

12. In a television system according to claim 11, wherein said blocking oscillator is characterized to respond to negative polarity horizontal pulses of said source for production of both positive and negative pulses repetitious at the horizontal sync signal repetition rate and said sawtooth wave producing means is characterized to produce a sawtooth wave signal at the rate of the horizontal timing pulses.

13. In a television system according to claim 12, wherein said sawtooth wave producing means includes a multivibrator arranged to produce narrow pulses at the rate of the horizontal timing pulses and a sawtooth wave generator responsive to said narrow pulses for deriving said sawtooth wave signal.

14. In a television system having a remote composite video signal source including a vertical blanking interval of negative polarity having at least equalizer and horizontal pulses and a local sync generator timer including a master oscillator normally synchronized to a given frequency and means producing timing pulses coupled to said master oscillator for generation of horizontal and vertical timing pulses; a sync hold circuit comprising control means responsive to the equalizer pulses of said source and the vertical timing pulses of said timer for production of a control pulse, means to apply said control pulse to said means producing timing pulses to alter the vertical timing pulse output for phase coincidence with the vertical blank interval of said source, comparison means responsive to the horizontal pulses of said source and the horizontal timing pulses of said timer for comparison thereof to produce a correction output, means to apply said correction output to said master oscillator to stabilize the frequency output thereof with respect to the repetition rate of the horizontal pulses of said source, and switching means associated with said control means and said comparison means to switch said timer from synchronization with said given frequency to synchronization with respect to the signal of said source when said control means is activated by the signal of said source.

15. In a television system according to claim 14, wherein said control means includes a pulse width discriminator having means for tuning for maximum response to the equalizer pulses of each scanning field, a first multivibrator responsive to only the first pulse of each series of equalizer pulses delivered by said discriminator being characterized to produce a positive pulse having a width equivalent to three horizontal scanning lines, a second multivibrator being responsive to negative polarity vertical timing pulses characterized to produce a negative polarity pulse having a width substantially equivalent to three horizontal scanning lines, and a non-coincident gating device coupled to the respective outputs of said first and second multivibrators being characterized to produce a negative polarity control pulse having a width no greater than three horizontal scanning lines when said respective outputs are non-coincident by more than three horizontal scanning lines with a diminishing width thereof directly proportional to the amount of non-coincidence between said respective outputs when within three horizontal scanning lines of coincidence.

16. In a television system according to claim 15, wherein said switching means includes a plural contact relay device activated by the pulse output of said first multivibrator.

17. In a television system according to claim 14, wherein said means producing timing pulses includes a slipping gate device responsive to said control pulse to cause a phase slippage of the vertical timing pulse output for each scanning field until phase coincidence is established between the vertical blanking interval of said source and the timing outputs of said timer.

18. In a television system according to claim 14, wherein said comparison means includes a blocking oscillator characterized to respond to the horizontal pulses of said source for production of both positive and negative pulses repetitious at the remote horizontal sync rate, a sawtooth wave producing means characterized to respond to the horizontal timing pulses of said timer for production of a sawtooth wave signal at the horizontal timing rate of said timer, and frequency control means associated with the outputs of said blocking oscillator and said sawtooth wave producing means for production of said correction output.

References Cited in the file of this patent

UNITED STATES PATENTS

| | | |
|---|---|---|
| 2,570,775 | De Baun | Oct. 9, 1951 |
| 2,597,743 | Millspaugh | May 20, 1952 |